United States Patent [19]

Nakamura et al.

[11] Patent Number: 5,058,002
[45] Date of Patent: Oct. 15, 1991

[54] PAGE SPLITTING METHOD AND APPARATUS FOR A DATABASE STORED IN A PLURALITY OF MEMORY STORAGE UNITS

[75] Inventors: Shunichiro Nakamura; Harumi Minemura; Tatsuo Minohara, all of Kanagawa, Japan

[73] Assignee: Mitsubishi Denki Kabushiki Kaisha, Tokyo, Japan

[21] Appl. No.: 206,324

[22] Filed: Jun. 13, 1988

[30] Foreign Application Priority Data

Jun. 23, 1987 [JP] Japan .................................. 62-155731
Sep. 24, 1987 [JP] Japan .................................. 62-239371

[51] Int. Cl.$^5$ ...................... G06F 15/40; G06F 12/02
[52] U.S. Cl. ................................. 364/200; 364/230.4; 364/245; 364/245.2; 364/254.3; 364/282.2; 364/282.4; 364/283.4
[58] Field of Search ................. 364/200, 300, 900

[56] References Cited

U.S. PATENT DOCUMENTS

| | | | |
|---|---|---|---|
| 4,412,285 | 10/1983 | Neches | 364/200 |
| 4,432,057 | 2/1984 | Daniell et al. | 364/200 |
| 4,445,171 | 4/1984 | Neches | 364/200 |
| 4,468,728 | 8/1984 | Wang | 364/200 |
| 4,543,630 | 9/1985 | Neches | 364/200 |
| 4,606,002 | 8/1986 | Waisman et al. | 364/200 |
| 4,611,272 | 9/1986 | Lomet | 364/200 |
| 4,635,189 | 1/1987 | Kendall | 364/200 |
| 4,677,550 | 6/1987 | Ferguson | 364/200 |
| 4,769,772 | 9/1988 | Dwyer | 364/200 |
| 4,774,657 | 9/1988 | Anderson et al. | 364/200 |
| 4,922,417 | 5/1990 | Churm et al. | 364/200 |
| 4,930,071 | 5/1990 | Tou et al. | 364/200 |
| 4,930,072 | 5/1990 | Agrawal et al. | 364/200 |

FOREIGN PATENT DOCUMENTS 0252234 1/1988 European Pat. Off. .

OTHER PUBLICATIONS

Sacca, D. and G. Wiederhold, "Database Partitioninng in a Cluster of Processors", ACM Transactions on Database Systems, vol. 10, No. 1, pp. 29-56 (Mar. 1985).
B. Gavish, A. Seger, "Set Query Optimization in Distributed Database Systems", ACM Transactidns on Database Systems, vol. 11, No. 3, pp. 265-293, Sep. 1986.
G. Sacco, "Fragmentation: A Technique for Efficient Query Processing", ACM Transactions on Database Systems, vol. 11, No. 2, pp. 113-133, Jun. 1986.
A. Seger, "Optimization of Join Operations in Horizontally Partitioned Database Systems", ACM Transactions on Database Systems, vol. 11, No. 1, pp. 48-80, Mar. 1986.
R. Keller, G. Lindstrom, "Approaching Distributed Database Implementations through Functional Programming Concepts", the 5th International Conference on Distributed Computing Systems, pp. 192-200, 1985.
S. Pramanik, D. Ittner, "Use of Graph-Theoretic Models for Optimal Relational Database Accesses to Perform Join", ACM Transactions on Database Systems, vol. 10, No. 1, pp. 57-74, Mar. 1985.

Primary Examiner—Gareth D. Shaw
Assistant Examiner—Matthew C. Fagan
Attorney, Agent, or Firm—Wolf, Greenfield & Sacks

[57] ABSTRACT

In a data processing system for management of a relational data base stored among a plurality of disc storage units, a method and apparatus for horizontally partitioning a physical page on the basis of tuples includes a master processor, a master disc storage unit coupled to the master processor, a plurality of slave processors controlled by the master processor, and a plurality of slave disc storage units, one coupled to each of the slave processors. The master disc storage unit stores, in the form of a B-tree structure, a clustered index for either an attribute or a relation to be processed in the relational data base. The plurality of slave disc storage units store divisionally a relation in the data base which is partitioned on the basis of a page for a clustered index thereof in such a manner that the plurality of slave processors may execute, in parallel, a plurality of processings on a cluster of tuples, as defined in their range in connection with a given key value of the clustered index.

10 Claims, 8 Drawing Sheets

| 18a | 18b | 18c | 18d |
|---|---|---|---|
| DEPT. NAME | SECTION NAME | NAME OF PERSONNEL | AGES |
| GENERAL | GENERAL | 山田 太郎 | 40 |
| GENERAL | PERSONNEL | 佐藤 弘 | 35 |
| GENERAL | ACCOUNTANTS' | 高橋 京子 | 24 |
| BUSINESS | BUSI. #2 | 斉藤 一 | 32 |
| GENERAL | PERSONNEL | 鈴木 明 | 29 |
| BUSINESS | BUSI. #1 | 山本 学 | 27 |
| BUSINESS | BUSI. #2 | 井上 次郎 | 31 |
| GENERAL | GENERAL | 中山 花子 | 29 |
| GENERAL | GENERAL | 村上 孝志 | 43 |
| BUSINESS | BUSI. #1 | 松木 純一 | 26 |

Rows: 17a–17j

PAGE SPLITTING METHOD AND APPARATUS FOR A DATABASE STORED IN A PLURALITY OF MEMORY STORAGE UNITS

BACKGROUND OF THE INVENTION

1. Field of the Invention

The present invention relates to a data processing system, and more particularly to a method of storing data base and file access processing for use in a relational data base management system.

2. Description of the Prior Art

Before going any further, it may be a help for the reader's better understanding of the invention to give a general review on the conventional art of relational data base management. In an art of relational data base management system, a data base is in the form of a collection of tables as typically shown in FIG. 6. An individual table is commonly called a relation 11, each of items in a table is called an attribute 18, and a record loaded actually with data in an attribute is called a tuple 17.

Figure 7:
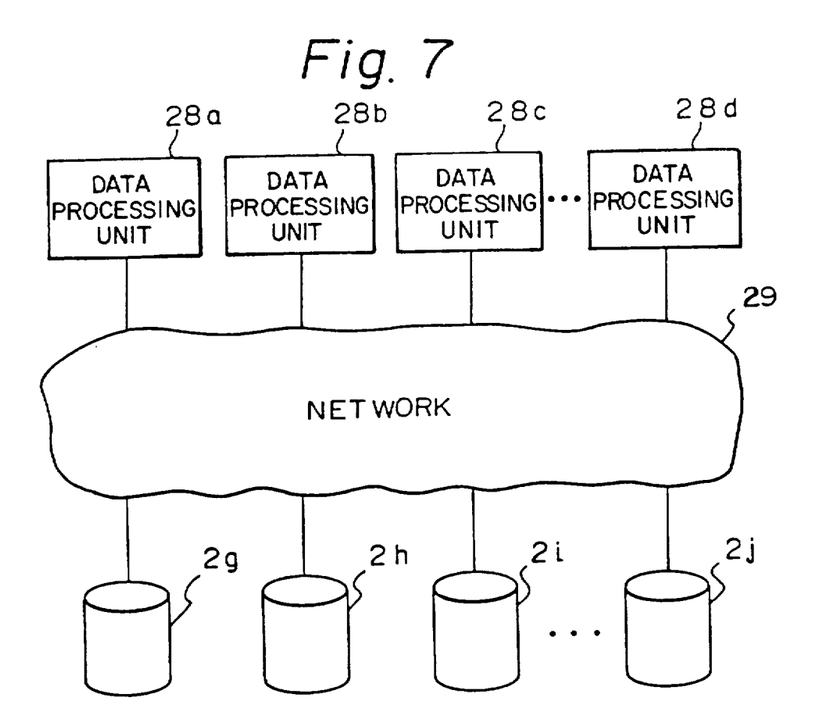
FIG. 7 is a schematic diagram showing an example of a system construction in reduction to practice of the invention.

Referring now to FIG. 7, there is shown a general scheme of relational data base management system, which is operable in a system wherein a plurality of data processing units 28a-28d are connected through a network 29 to a plurality of disc storage units 2g-2j, and wherein one relation is stored in fragmentation into the plurality of disc storage units 2g-2j in such a manner that the plurality of data processing units 28a-28d may in parallel have access to any data contained in the relation as stored in these disc storage units 2g-2j. In this scheme, it is called horizontal partitioning to have a single relation partitioned horizontally by way of tuples.

According to this horizontal partitioning, in a case that a relation to be stored has no clustered indexes, it is possible in practice to store the relation in such a manner that each of disc storage units may have generally even tuples, if it is arranged to put tuples to be stored into a disc storage having currently a smallest number of tuples stored.

With a relation partitioned evenly as noted above, the plurality of data processing units 28a-28d may read-in data from each of disc storages 2g-2j in a generally even time interval, and with this arrangement, there will occur no occasion such that a certain data processing unit has not finished reading data, while others have already read data therein during a data handling operation, which may consequently result in an increased speed of data processing, accordingly.

This is a typical construction of the conventional horizontal partitioning in a relational data base management system, and this is of a partitioning system which is essentially adaptable to a relation having no clustered indexes. In this respect, therefore, this partitioning system cannot be adapted to the partitioning of a relation having clustered indexes, and for this reason, it is a problem such that a processing of high speed access to certain tuples in a relation cannot be attained in practice by taking advantage of the clustered indexes.

Figure 8:
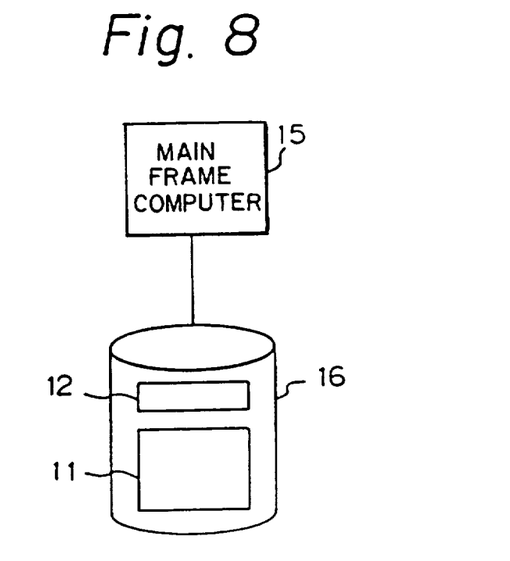
FIG. 8 is a block diagram showing the general construction of a typical conventional data processing unit.
Figure 9:
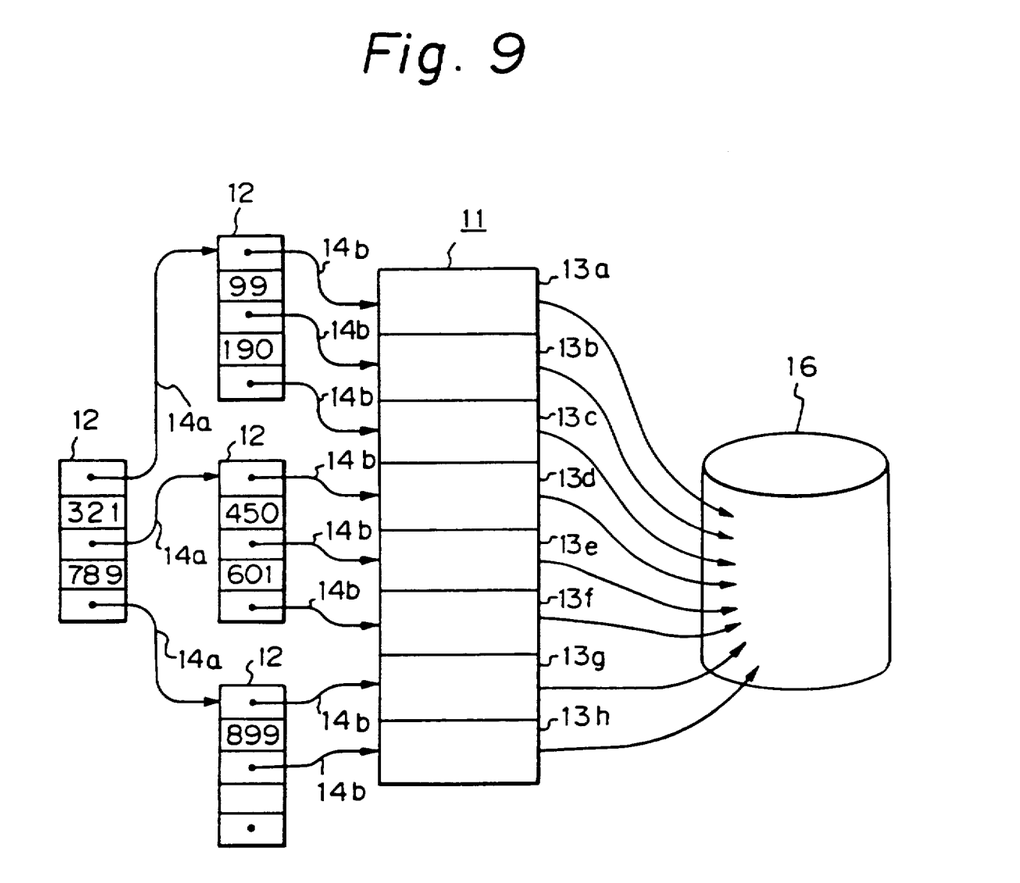
FIG. 9 is a schematic diagram showing a typical arrangement of storing a relation having clustered indexes in the conventional data processing system.

Next, reference is made to FIG. 8 which shows schematically a typical conventional data processing unit. In this figure, there are shown an electronic computer or main frame designated at the reference numeral 15, a disc storage unit at the reference numeral 16 connected operatively to the main frame, a relation at 11 contained in a data base connected to the disc storage 16, and a clustered index at 12 attached to the relation 11. This cluster index 12 is, for instance, of the type as disclosed in J. D. Ullman's "Principle of Database Systems", paragraph 2.4; issued from Computer Science Press Inc. (Japanese translation: "Database system no genri", translated by Toshiyasu Kunii (phonetic) issued from Nippon Computer Kyokai; p. 71, line 15 through p. 79, line 17). While no particular reference is made to as the clustered index in this literature, what is stated as "B-tree" is obviously of the clustered index. In general, it is arranged that tuples in a relation 11 are sorted in accordance with a key number particular to a clustered index 12 so as to be stored in a disc storage unit 16. In FIG. 9, there is shown an example wherein clustered indexes are given to attributes (keys) having an integer number ranging from 1 to 1000. The relation 11 may be sorted in accordance with a given key number, partitioned into eight pages 13a-13h, and stored into the disc storage 16. A pointer 14a is given a number of a page with a pointer 14b stored therein, and the pointer 14b is given page numbers 13a-13h in the relation 11, respectively. With such arrangement, when a specific key number for a tuple is specified, the page number in which that tuple is stored may immediately be known by referring to the pointers 14a and 14b.

Figure 6:
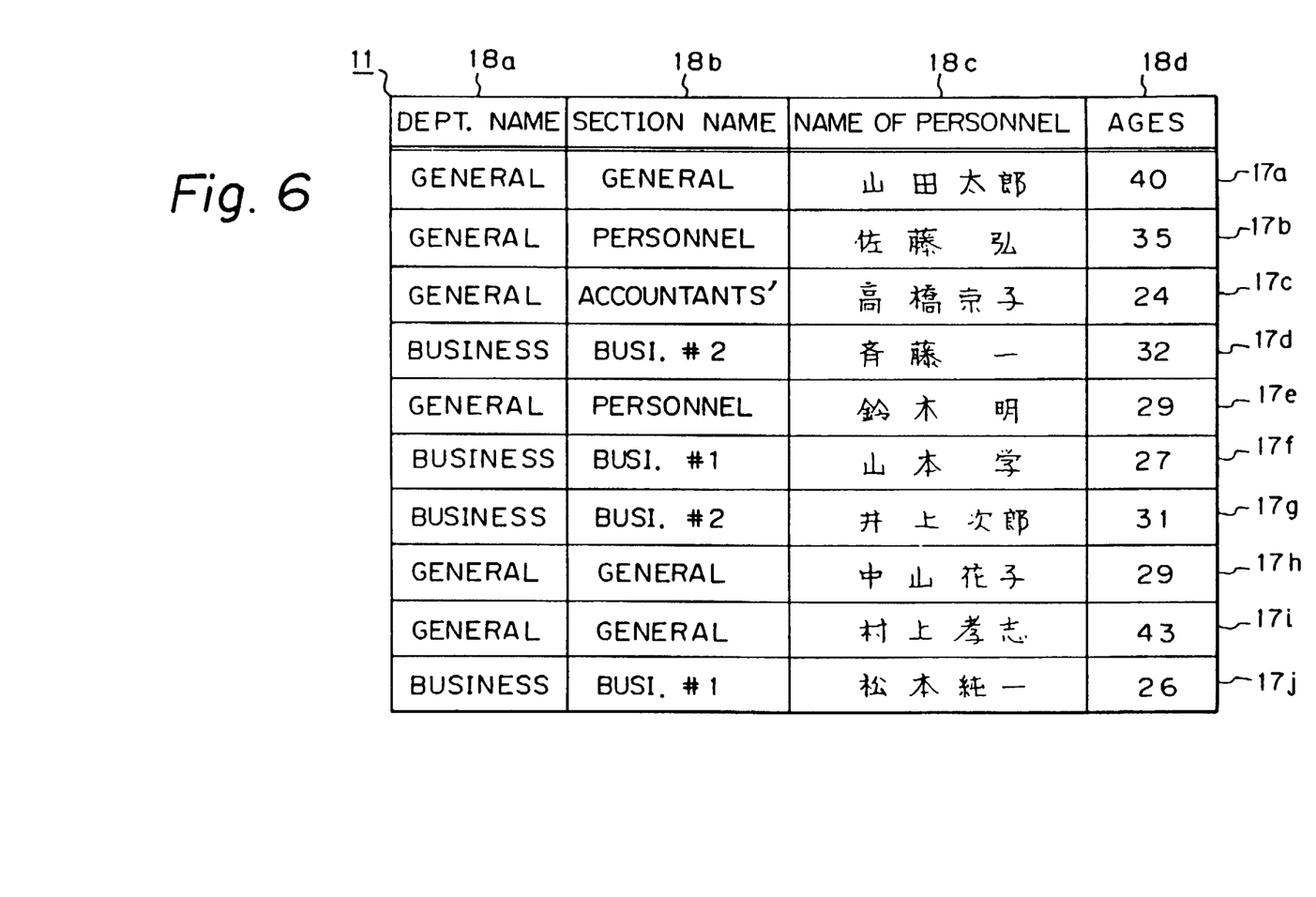
FIG. 6 is an explanatory schematic diagram showing an example of a typical relation in a relational data base.

According to the relational data base as reviewed above, all data involved can then be managed in a form of table. This table is referred to as a relation. Each data as contained in each of rows in a relation is called a tuple. Also, each of items (columns) of a relation is called an attribute. According to an example shown in FIG. 6, shown are one relation designated at the reference number 11, tuples at 17a-17j, and attributes designated at 18a-18d, respectively. In a relational data base, it is common in practice that a processing may be directed to a group of tuples which are defined in their range specified in connection with certain specified attributes or with a combination of attributes (hereinafter referred to as "keys"). For instance, in the relation 11 shown in FIG. 6, this is a case of processing such that an average of the attribute 18d "Ages" is to be obtained with the values "General Section" under the attribute 18b of "Name of Section". In this example, the attribute 18b "Name of Section" is a key.

According to the conventional data processing unit as typically shown in FIG. 8, when a processing is performed on a cluster of tuples as defined in terms of their range in connection with the value of key for the clustered index as noted above, the main frame 15 operates first to refer to the pointers 14a, 14b to the clustered indexes 12, check in which page the relevant cluster of tuples are stored, and read them together by way of page out of the disc storage unit 16 for processing. Since the cluster of tuples as defined in their range in accordance with the key value of the clustered indexes is put together by way of page and stored into the disc storage unit 16 with their range being restricted rather physically, it may suffice to read-out only a due page from the disc storage unit 16, thus making a processing substantially quicker than the case having no clustered indexes, accordingly. For instance, in FIG. 9, by virtue of a cluster of tuples as existing with the key value in the range from 99 to 190 in the page 13b alone, it would be enough to read the page 13b only from the disc storage unit 16, thus resulting in an quicker processing.

While a high speed processing may be attained by way of the adoption of the clustered indexes according to the conventional data processing unit, as demands for data base management increase lately and as demands for a quicker data processing grow extensively, it is difficult to make the data processing further quicker by way of the conventional data processing which is managed by a single main frame per se.

In consideration of such drawbacks particular to the conventional construction of a relational data base management system in mind, it is desired to attain an efficient solution for overcoming such inevitable problems particular to the conventional construction.

The present invention is essentially directed to the provision of a proper solution to such inconveniences and difficulties in practice as outlined above.

SUMMARY OF THE INVENTION

It is therefore a primary object of the present invention to provide an improvement in the relational data base management system, which can afford a desired horizontal partitioning of a data base enabling an even partitioning of a relation having clustered indexes.

Another object of the invention is to provide an improvement in the relational data base management system, which can afford a desired quicker processing on a cluster of tuples as defined in their range in connection with the key values of clustered indexes in a relational data base.

According to the present invention, there is attained an improvement in the horizontal partitioning system of a data base, wherein when storing a relation with clustered indexes comprised of a B-tree structure into a plurality of disc storage units, and when a physical page in the disc storage unit is to be filled with a plurality of tuples in the relation, the page may be divided into two in such a manner that one of thus-divided page may be stored into a disc storage unit which has currently a least page containing the tuples for the relation, thus effecting an even horizontal partitioning of a data base.

With this arrangement of horizontally partitioning a data base according to the invention, when storing a plurality of tuples in a relation having clustered indexes into a disc storage unit, and when a physical page storing the tuples is to be filled up, the page may be divided into two, and after these tuples are stored into one of thus-divided half page, the other half page is fed to a disc storage unit having currently a least number of pages, whereby an even status of partitioning is maintained wherein a generally equal number of tuples may automatically be stored in the disc storage, accordingly.

Also, with this arrangement of data processing unit according to the invention, clustered indexes in a relation may be possessed by a primary disc storage for a primary processing system, a relation partitioned on page basis may be stored divisionally into a secondary disc storage connected operatively to a plurality of secondary processing units, and processing on a cluster of tuples as defined in their range in connection with key values of clustered indexes may be performed in parallel and at a high rate on the part of secondary processing units, respectively.

According to the present invention, by virtue of such arrangement that a cluster of tuples as defined in their range in connection with key values of clustered indexes may be stored divisionally on page basis in secondary disc storages connected to a plurality of secondary processing units, processing on such a cluster of tuples may be performed in parallel, thereby to effect a high speed data processing, accordingly.

As outlined hereinbefore, with such an advantageous arrangement according to the invention that a relation even with clustered indexes may be partitioned horizontally and evenly, in a system permitting a plurality of data processing units to make concurrent access to a plurality of disc storages, there is attainable, in addition to a high speed processing by taking advantage of clustered indexes, an effect such that each data processing unit may read-in data in an even time interval for the processing of a total record search, thereby to allow reading data at a minimum time interval.

Furthermore, by virtue of an advantages according to the invention such that processing on a cluster of tuples as defined in their range in connection with key values of clustered indexes may be performed in parallel by a plurality of secondary processing units, there is attained an advantageous effect that process on a cluster of tuples as such defined in their range may be executed in parallel and at a high rate, accordingly.

Additional features and advantages of the invention will now become more apparent to those skilled in the art upon consideration of the following detailed description of a preferred embodiment exemplifying the best mode of carrying out the invention as presently perceived. The detailed description refers particularly to the accompanying drawings, in which like parts are designate at like reference numerals.

DESCRIPTION OF THE PREFERRED EMBODIMENT

Figure 1:
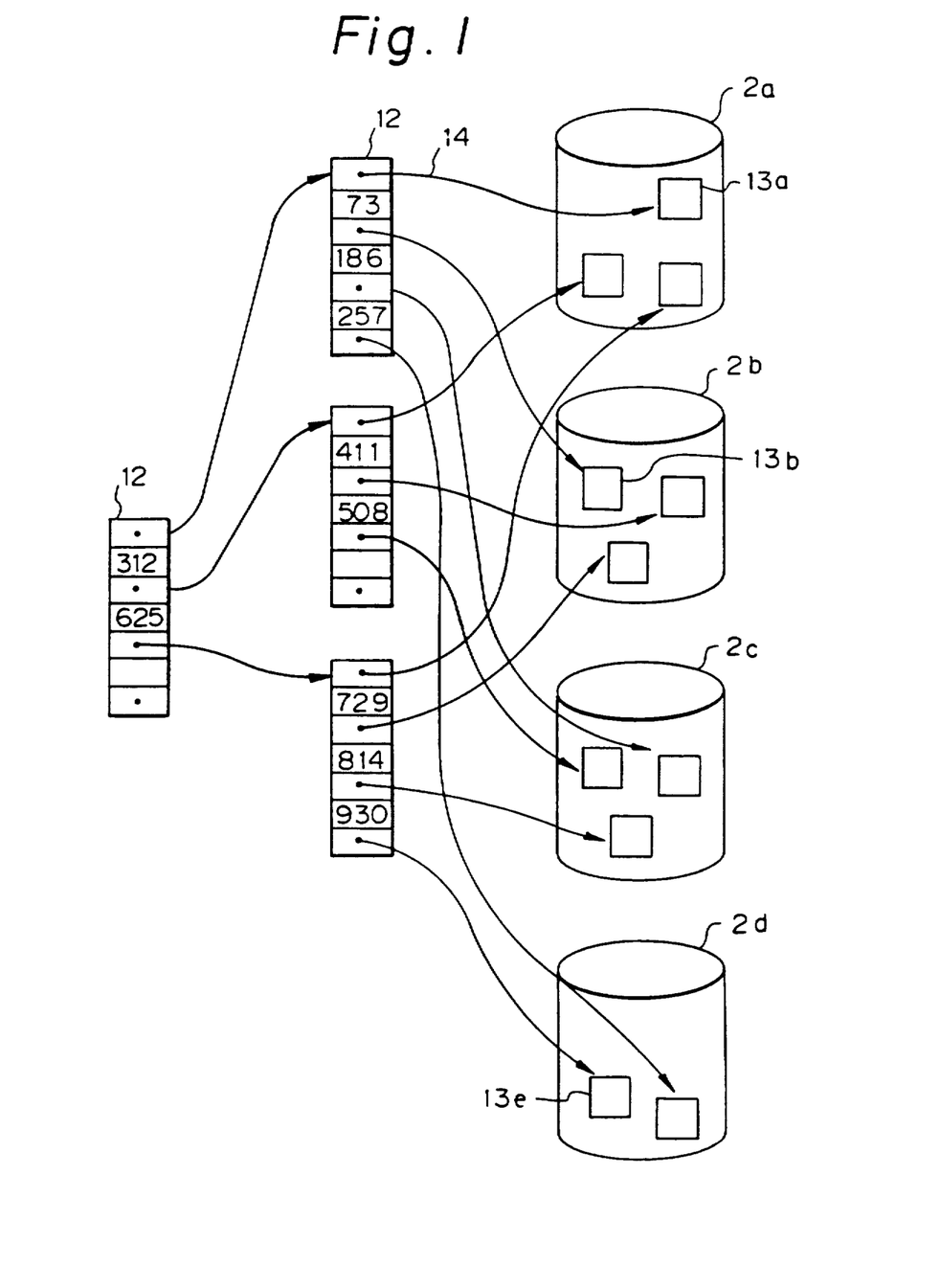
FIG. 1 is an explanatory schematic view showing the general status of partitioning of a relation having clustered indexes by way of a preferred embodiment of the present invention.

The present invention will now be explained in detail by way of a preferred embodiment thereof in conjunction with accompanying drawings herewith. Referring first to FIG. 1, there is shown a typical clustered index 12.

Each of tuples is seen stored in an order of sorting in pages 13a–13e which are of a physical storing unit in a disc storage units 2a–2d. In FIG. 1, there is shown a typical example of storage wherein clustered indexes are given to attributes having an integer ranging from 1 to 1000, wherein a cluster of tuples having a smaller number of a key value than 73 are, for instance, stored in a page 13a of a disc storage 2a, while those tuples having key values ranging from 73 through 186 are then stored in a page 13b of a disc storage 2b. In this manner, when specifying a key value of a tuple, a particular disc storage and a specific page may be determined by a pointer 14 as belonging to a certain clustered index, accordingly.

Figure 2:
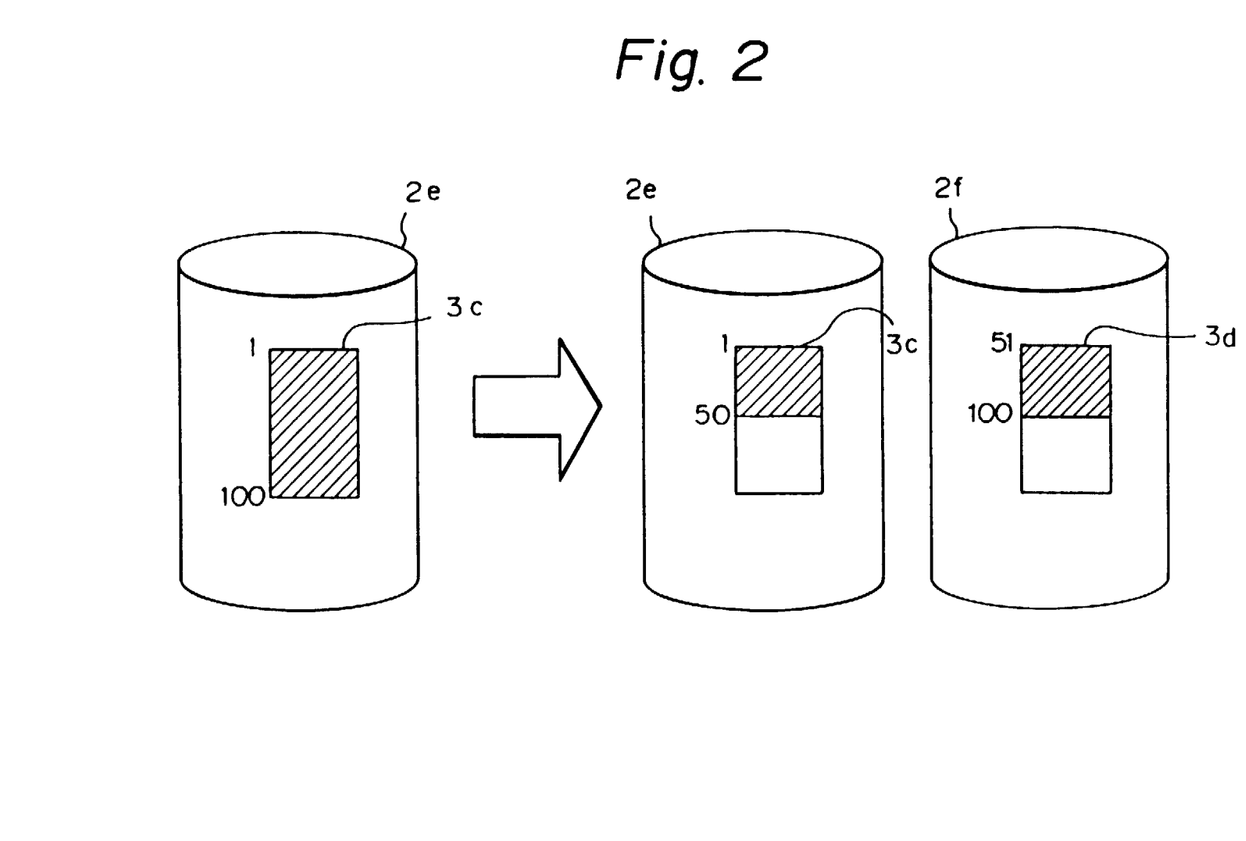
FIG. 2 is an explanatory schematic view showing an example of dividing a page in a relation by way of a preferred embodiment of the present invention.
Figure 3:
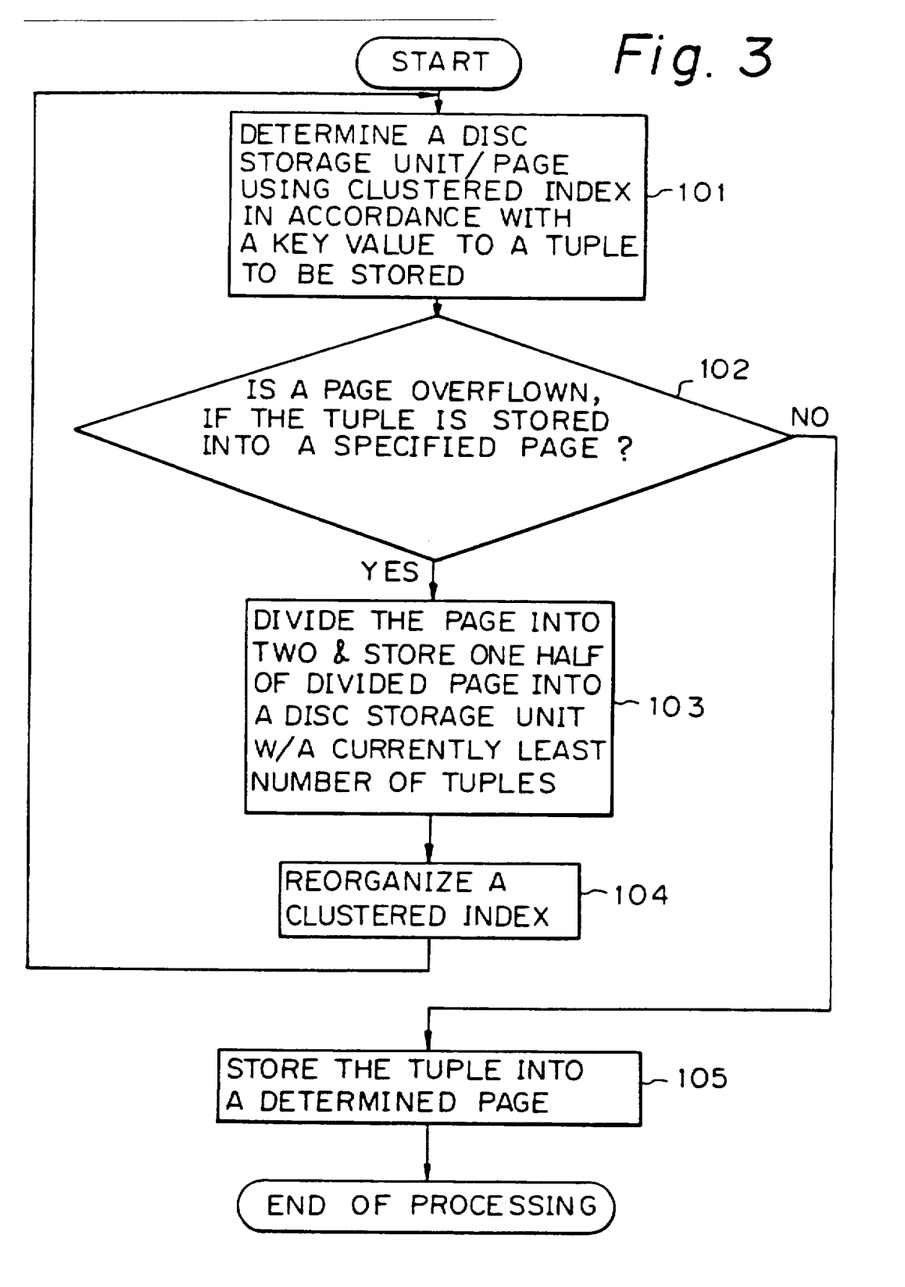
FIG. 3 is a flow chart showing a typical program in a sequence to practice by way of a preferred embodiment of the present invention.

When storing a specific tuple in a relation having clustered indexes into a disc storage unit, as typically shown in FIG. 3 flow chart, a particular clustered index may be referred to in accordance with a key value of corresponding tuple to determine a disc storage and a page to be stored (Step 101), and when having that tuple stored into thus-determined page, it is examined if the specific page is filled up or not (Step 102). If it is determined with the result of this examination that the page would overflow, this page may be divided into two. One of such divided half page is to be transferred to a disc storage having a currently least number of tuples stored (Step 103). FIG. 2 shows this situation, wherein it is shown that when tuples with an integral key value ranging from 1 to 100 are stored in a page 3c of the disc storage unit 2e, and when tuples with this range of key value from 1 to 100 are to be stored into this page 3c, this page is divided into two as it is filled up, and that tuples with a key value ranging from 1 to 50 are stored in the original page 3c, while tuples with a key value ranging from 51 to 100 are stored into the other page 3d, respectively. It is to be noted that it is a specific disc storage 2f that is selected for storing the page 3d and that has a currently least number of pages comprised of tuples in a relation to which these tuples belong. Upon the dividing of the page, following is a step of reorganization of the clustered indexes (Step 104), and subsequently, a series of Steps 101 et. seq. are followed in repetition. If no overflow of the page is found in Step 102, these tuples may be stored into a page to be determined in Step 105.

Referring to this embodiment, while an explanation was given on the system structure such that there is provided a network 29 intercommunicating the disc storage units 2g-2j and the data processing units 28a-28d, any type of network may of course be feasible in practice, such as a ring type, a single-bus type or the like, which may well serve to an equal effect with that of the embodiment noted above.

Figure 4:
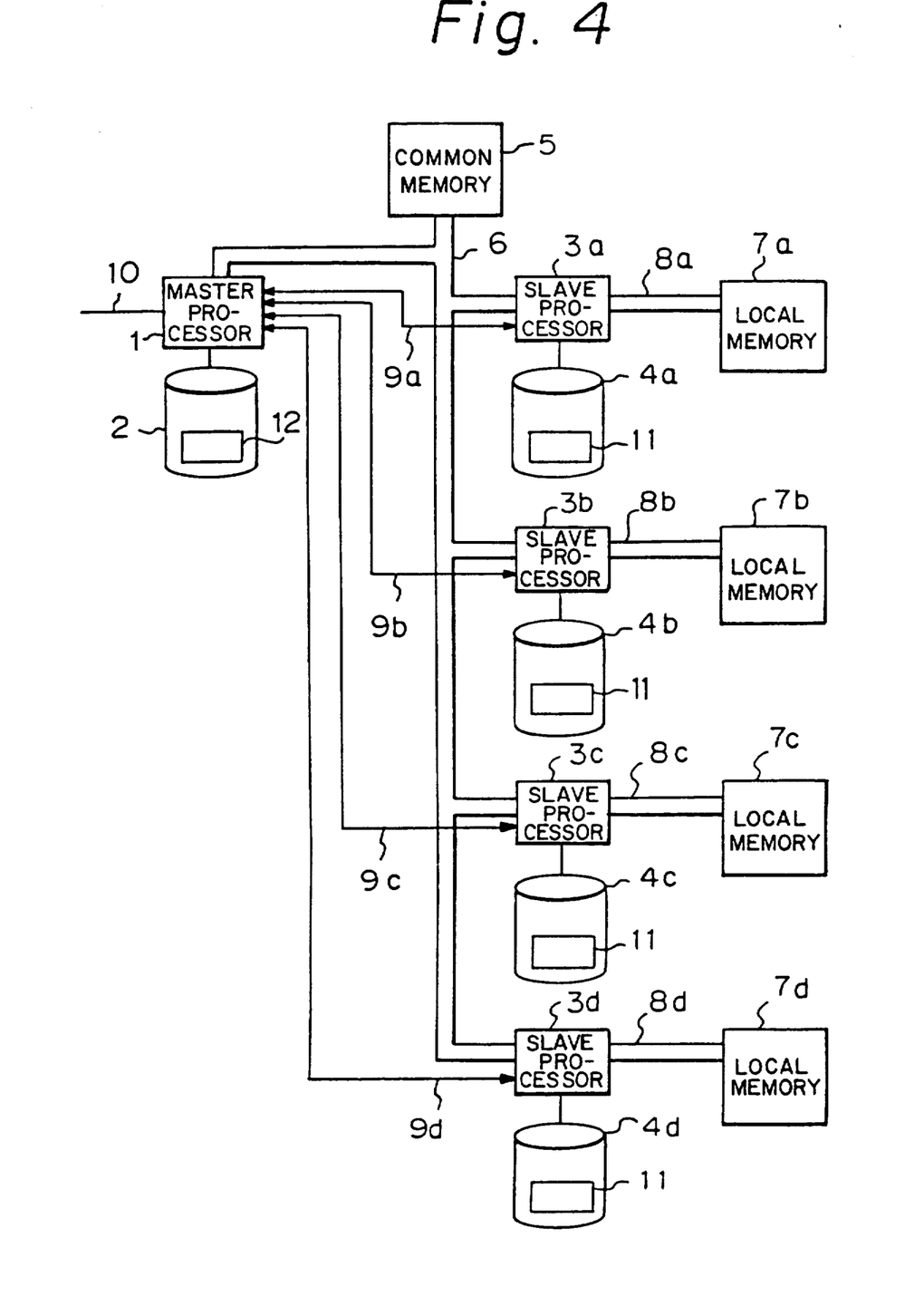
FIG. 4 is a block diagram showing a data processing unit to be reduced in practice by way of a preferred embodiment of the present invention.
Figure 5:
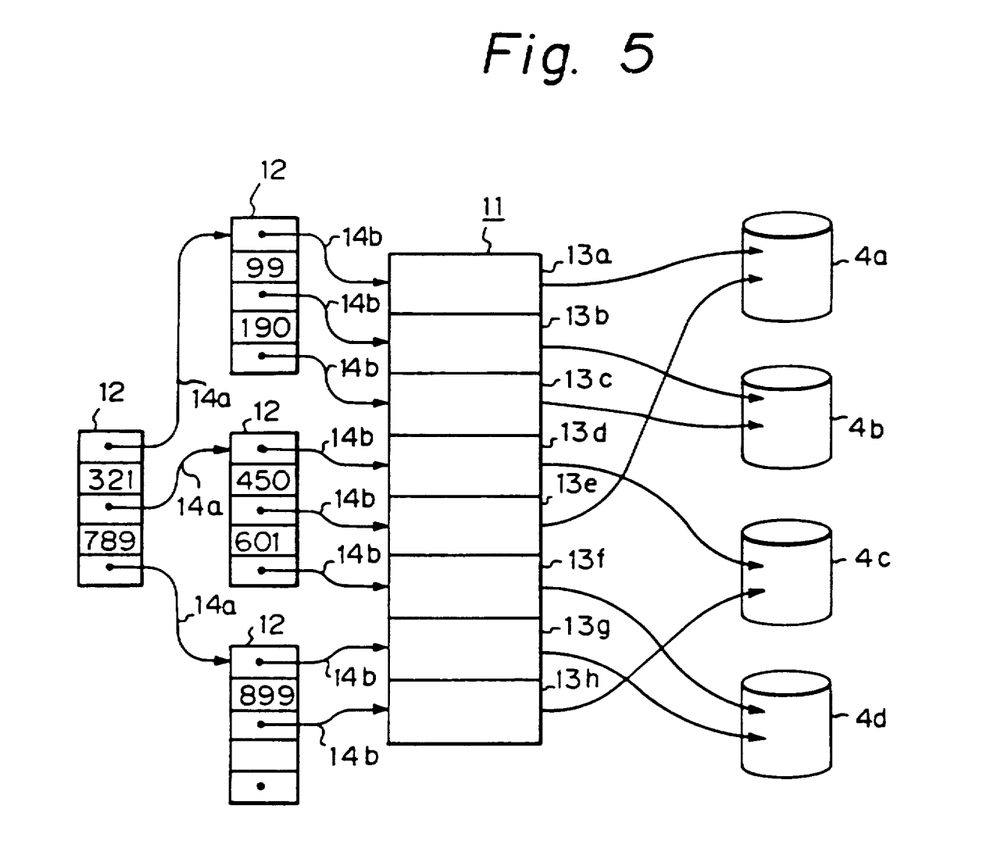
FIG. 5 is a schematic view showing a status of partitioning of a relation having clustered indexes by way of a preferred embodiment of the present invention.

FIG. 4 is a block diagram showing a preferred embodiment of a data processing system according to the invention. In FIG. 4, there are shown provided a primary or master processing unit designated at 1 (hereinafter referred to as "master processor"), a primary or master disc storage unit at 2 connected to the master processor (hereinafter referred to as "master disc unit"), a series of secondary or slave processing units at 3a-3d (hereinafter referred to as "slave processors"), and a series of secondary or slave disc storage units at 4a-4d connected to the slave processors (hereinafter referred to as "slave disc units"). Also shown are a common memory at 5, which may be accessed by the master processor 1 and the slave processors 3a-3d by way of a common bus 6, a plurality of local memories at 7a-7d, which may be accessed by the slave processors 3a-3d by way of local buses 8a-8d, a plurality of interrupt signal lines at 9a-9d used for a communication between slave processors 3a-3d by way of an interrupt signal, and an input/output line at 10 for input and output of data between another computer or an external terminal and the master processor. Also shown is a relation designated at 11, which may be divided into a prefixed (e.g., 2K bytes) unit (hereinafter referred to as "page") and may be stored divisionally on the basis of this page into the slave disc units 4a-4d. There are also seen a series of clustered indexes designated at 12 for the relation 11, which is stored into the master disc unit 2. The clustered indexes 12 are of an index comprised of a B-tree structure, and the tuples in the relation 11 may be sorted in accordance with a given key value to the clustered indexes 12, and may be divided into a desired number of pages to be stored into the slave disc units 4a-4d. FIG. 5 is a schematic diagram showing by way of an example the provision of clustered indexes on the attributes (keys) having a range of integer numbers from 1 to 1000. Relation 11 may be sorted in accordance with a given key value, and may be partitioned into eight pages 13a-13h. Pages 13a and 13e may be stored in the slave disc unit 4a, pages 13b and 13c stored in the slave disc unit 4b, pages 13d and 13h stored in the slave disc unit 4c, pages 13f and 13g are stored in the slave disc unit 4d, respectively. For example, tuples with a key value smaller than 99 may be stored in page 13a of the slave disc unit 4a, and those with a key value ranging from 99 to 190 stored in page 13b of the slave disc unit 4b, respectively. A pointer 14a is provided with the number of a page in the master disc unit in which a pointer 14b is stored, and a pointer 14b is provided with the number of a slave disc unit in which the relation 11 is stored and the number of a page of this disc unit. With this arrangement, when a key value of tuple is specified, a specific slave disc unit and page in which this specific tuple is stored may be known by routing a pointers 14a and 14b to the clustered index 12, accordingly.

Referring now to the embodiment shown in FIG. 4, the operation how to process on a cluster of tuples as defined in their range in connection with a given key value of the clustered indexes will be explained. In this system, a cluster of tuples as such defined in their range is divided into a plurality of pages and stored possibly evenly in division among four of the slave disc units. For example, according to the example shown in FIG. 5, it is noted that a cluster of tuples having key values ranging from 190 through 789 is divided into four pages 13c through 13f, and stored in the slave disc units 4b, 4c, 4a and 4d, respectively. When a demand for processing on the cluster of tuples is made from another computer or an external terminal by way of the input/output line 10, the master processor 1 operates to refer to the pointers 14a, 14b to the clustered indexes 12, seek numbers of a slave disc unit and of a page in which the relevant cluster of tuples are stored divisionally, write into the common memory 5 a command comprising a content of processing, a page number, etc. to each of the slave processors 3a through 3d, interrupt in succession each of the slave processors 3a-3d by way of interrupt signal lines 9a-9d, and inform each of the slave processors 3a-3d of the existence of a processing to be executed. Each of these slave processors 3a-3d operates then to read a command directed to itself from the common memory 5, refer to a page number contained in this command, and read out a relevant page from each of the slave disc units 4a-4d. This readout and processing of a page from these slave disc units 4a-4d may be done in parallel on the part of each of the slave processors 3a-3d. Upon completion of such processing, each of such slave processors 3a–3d operates to write the results of processing into the common memory 5, and interrupt the master processor 1 by way of the interrupt signal lines 9a–9d to report the completion of processing. Upon an interrupt from all of the slave processors 3a–3d, the master processor 1 operates then to read out all results of processing from the common memory 5, and return such results to another computer or an external terminal by way of the input/output line 10.

It is now clear that the objects as set forth hereinbefore among those made apparent from the preceding description are efficiently attained, and while the numbers of such components as the slave processor 3a–3d, the slave disc units 4a–4d, the local memories 7a–7d, the local buses 8a–8d, and the interrupt signal lines 9a–9d are four according to the preferred embodiment of the invention as noted above, it is to be understood that they may of course be any numbers such as one or more, respectively.

While there are provided one each of the master disc unit 2 and the slave disc units 4a–4d in the master processor 1 and in each of the slave processors 3a–3d, respectively, according to the embodiment noted above, it is also to be understood that they may naturally be of any numbers of two or more.

It is also to be understood that the appended claims are intended to cover all of such generic and specific features particular to the invention as disclosed herein and all statements relating to the scope of the invention, which as a matter of language might be said to fall thereunder.

What is claimed is:

1. A method of storing a relation of a data base in pages of memory in a plurality of memory storage units by horizontally partitioning tuples of the relation, comprising the steps of:
   indexing said pages of memory with a cluster index stored in one of the memory storage units;
   determining when one of said pages of memory is filled with tuples;
   allocating at least one new page in at least one of the memory storage units;
   transferring a portion of the tuples from the memory of the full page to the at least one new page in the at least one memory storage unit; and
   reorganizing the cluster index to correspond to the at least one new page after the full page is partitioned.

2. A method as set forth in claim 1 wherein the portion of tuples transferred from the full page comprises one half of the tuples in the full page.

3. A method as set forth in claim 1 wherein at least one of the memory storage units comprises a magnetic disk.

4. A method as set forth in claim 1 wherein the at least one new page is allocated in said at least one memory storage unit currently containing fewer pages of tuples of the relation than others of said memory storage units.

5. A data processing system for managing data tuples organized into attributes of a relation which are stored in pages of memory, comprising:
   a master processor;
   a master memory storage means coupled to the master processor for storing a clustered index for the relation;
   a plurality of slave processors coupled to and controlled by the master processor;
   a plurality of slave memory storage means each slave memory storage means associated with and coupled to one of the slave processors for storing pages of data from the relation;
   means, within the master processor, for partitioning a first page of data stored in a first slave memory storage means into a plurality of pages when the first page becomes filled with data tuples by allocating at least one new page in at least one of the slave memory storage means, and transferring a portion of the tuples from the first page of the first slave memory means to the at least one new page of the at least one slave memory means; and
   means within the master processor, for reorganizing the clustered index to correspond to the at least one new page after said first page is partitioned.

6. A data processing system as set forth in claim 5 wherein the first page is partitioned into a second and a third page.

7. A data processing system as set forth in claim 6 wherein the first page is partitioned into second and third pages each containing one half of the data tuples from the first page.

8. A data processing system as set forth in claim 5 further comprising:
   means, within the master processor, for storing the at least one new page in the at least one slave memory storage means containing fewer pages of data tuples of the relation than others of said slave memory storage means.

9. A data processing system as set forth in claim 5 wherein the clustered index of a B-tree structure.

10. A data processing system for managing data tuples organized into attributes of a relation which is stored in pages of memory comprising:
    a master processor;
    a master magnetic disk memory unit coupled to the master processor for storing a B-tree clustered index for the relation;
    a plurality of slave processors coupled to and controlled by the master processor;
    a plurality of slave magnetic disk memory units;
    each slave memory unit being coupled to a respective one of the slave processors for storing pages of data tuples of the relation;
    means, within the master processor, for partitioning a first page of data stored in one of said slave memory units into second and third pages, each containing one half of the data from the first page, when the first page becomes filled with data tuples, the second page being stored in said one slave memory unit and the third page stored in another of said slave memory units containing pages of data tuples of the relation; and
    means, within the master processor for reorganizing the clustered index to correspond to the second and third pages after said first page is partitioned.

* * * * *